US012343955B2

(12) United States Patent
Spatafora

(10) Patent No.: US 12,343,955 B2
(45) Date of Patent: Jul. 1, 2025

(54) MACHINE FOR MANUFACTURING DISPOSABLE CUPS

(71) Applicant: MS2 S.R.L., Granarolo Dell'Emilia (IT)

(72) Inventor: Matteo Spatafora, Granarolo Dell'Emilia (IT)

(73) Assignee: MS2 S.R.L., Granarolo Dell'Emilia (IT)

( * ) Notice: Subject to any disclaimer, the term of this patent is extended or adjusted under 35 U.S.C. 154(b) by 0 days.

(21) Appl. No.: 18/695,629

(22) PCT Filed: Sep. 27, 2022

(86) PCT No.: PCT/IT2022/050261
§ 371 (c)(1),
(2) Date: Mar. 26, 2024

(87) PCT Pub. No.: WO2023/047430
PCT Pub. Date: Mar. 30, 2023

(65) Prior Publication Data

US 2024/0424758 A1 Dec. 26, 2024

(30) Foreign Application Priority Data

Sep. 27, 2021 (IT) ........................ 102021000024710

(51) Int. Cl.
*B31B 50/00* (2017.01)
*B31B 50/02* (2017.01)
(Continued)

(52) U.S. Cl.
CPC .......... *B31B 50/024* (2017.08); *B31B 50/064* (2017.08); *B31B 50/07* (2017.08);
(Continued)

(58) Field of Classification Search
CPC ......... B31B 1/90; B31B 15/00; B31B 50/324; B31B 2105/0022; B31B 50/32; B31B 50/00
(Continued)

(56) References Cited

U.S. PATENT DOCUMENTS 1,819,318 A * 8/1931 Barbieri .................. B31B 50/32 493/107
2,931,276 A * 4/1960 Zerlin ...................... B23Q 7/04 198/474.1
(Continued)

OTHER PUBLICATIONS

International Search Report for PCT/IT2022/050261 dated Jan. 9, 2023 (2 pgs).

*Primary Examiner* — Jacob A Smith
(74) *Attorney, Agent, or Firm* — Tutunjian & Bitetto, P.C.

(57) ABSTRACT

A machine for manufacturing disposable cups, including a side element, obtained from a blank of sheet material folded into a conical shape and sealed by a bottom element of circular shape, including a forming wheel rotatable with continuous motion. The forming wheel has a plurality of peripherally distributed forming assemblies including respectively a mandrel of tubular form carried by a support member swinging around an axis parallel to said axis of rotation of the forming wheel. First feeding means is adapted to orderly collect and insert single bottom elements into corresponding forming assemblies of the forming wheel. Second feeding means is adapted to collect single blanks in an orderly manner from a store in which the blanks are stacked and to transfer them in sequence, in an extended configuration, to the corresponding forming assemblies of said forming wheel.

10 Claims, 9 Drawing Sheets

(51) Int. Cl.

| | |
|---|---|
| ***B31B 50/06*** | (2017.01) |
| ***B31B 50/07*** | (2017.01) |
| ***B31B 50/32*** | (2017.01) |
| ***B31B 50/64*** | (2017.01) |
| *B31B 110/10* | (2017.01) |
| *B31B 110/20* | (2017.01) |

(52) U.S. Cl.
CPC .......... *B31B 50/322* (2017.08); *B31B 50/642* (2017.08); *B31B 2110/10* (2017.08); *B31B 2110/20* (2017.08)

(58) Field of Classification Search
USPC ....... 493/109, 158, 106, 105, 164, 107, 129, 493/108
See application file for complete search history.

(56) References Cited

U.S. PATENT DOCUMENTS

| | | | |
|---|---|---|---|
| 3,157,096 A | 11/1964 | Werner | |
| 4,317,323 A | 3/1982 | Richards et al. | |
| 4,645,480 A * | 2/1987 | Kontz | B29C 61/025 493/107 |
| 8,939,187 B2 | 1/2015 | Riethmueller et al. | |
| 10,035,321 B2 | 7/2018 | Stahlecker et al. | |
| 2012/0145310 A1* | 6/2012 | Riethmueller | B31B 50/00 156/187 |

* cited by examiner

MACHINE FOR MANUFACTURING DISPOSABLE CUPS

TECHNICAL FIELD

The present invention relates to a machine for manufacturing disposable cups and the like.

PRIOR ART

The use of disposable cups intended to contain both hot and cold drinks, commonly known as paper cups, is known in various sectors. Paper cups are generally made from a blank element of a suitable sheet material, folded in a slightly conical shape to form the side wall of the cup and sealed by a circular bottom.

The use of different materials is known for manufacturing paper cups, in general depending on the use, in particular whether they are intended to contain hot drinks or cold drinks. For example, the use of cups in cellulose pulp, capable of resisting to a temperature of 70° C., or alternatively, for lower temperatures, cups of biodegradable bioplastic of the lactic acid or PLA type is known; as well as cups in laminates of paper plastic, consisting of a sheet of cardboard coated inside with a PLA film are known.

Currently, paper cups are manufactured by automatic machines operating with intermittent movement. Said automatic machines are equipped with one or more wheel- or star-shaped parts operated in stepwise rotation to bring in sequence each blank element at a plurality of operating stations.

Automatic machines for manufacturing disposable cups are illustrated for example in patent documents U.S. Pat. Nos. 8,939,187 and 10,035,321. U.S. Pat. No. 1,819,318 shows a further example of an automatic machine for manufacturing disposable cups.

The intermittent operation of the aforementioned machines imposes an obvious limitation on their operating speed and consequently on the achievable productivity. This is a considerable constraint in the specific sector, as they are single-use products and therefore necessarily inexpensive, high productivity instead would be required.

To increase the speed of the machine, an attempt was made to divide the most time-consuming operative steps among a plurality of stations, in order to reduce downtime. However, this solution cannot adequately solve the problem of high productivity at economic costs. In practice, the productivity of current machines is generally around 300 cups per minute.

DISCLOSURE

The aim of the present invention is to solve the aforementioned problems, by devising a machine that permits to perform automatic manufacturing of paper cups with a high operating speed, in order to ensure high productivity.

As part of this aim, it is a further object of the invention to provide a machine for making paper cups of any suitable sheet material.

Another object of the invention is to provide a machine that permits to perform the manufacturing of paper cups with high resistance.

A further object of the invention is to provide a machine that permits to perform the manufacturing of paper cups suitable to contain both hot and cold drinks.

A still further object of the invention is to provide a machine that permits to perform the manufacturing of paper cups of proportionally low cost.

A still further object of the invention is to provide a machine for manufacturing paper cups of simple construction and functional conception, with reliable operation, versatile use, as well as relatively low cost.

The aforementioned objects are achieved, according to this invention, by the machine for manufacturing disposable cups according to claim 1.

The disposable cups to be manufactured include a side element, obtained from a blank of sheet material folded into a conical shape, closed tightly by a circular base element.

According to the present invention, the machine includes a forming wheel operable in rotation with continuous movement according to an axis of rotation and bearing a plurality of peripherally distributed forming assemblies comprising respectively a tubular mandrel having a profile corresponding to the cup to be made.

Advantageously, the tubular mandrel is carried by a support device which may swing around an axis parallel to said axis of rotation of the forming wheel.

Said forming assemblies comprise respective grippers placed in positions diametrically opposite to said mandrel and operated independently of each other to hold said single blanks wound into tubular form on the same mandrel.

The machine comprises first feeding means adapted to orderly collect and insert single bottom elements into corresponding forming assemblies of said forming wheel.

Preferably said first feeding means comprises a shearing member adapted to cut in sequence said single bottom elements from a strip of material wound in a reel; an annular drawing die forming an internal portion with a converging profile; a punch, coaxial to said shearing member, adapted to perform the drawing of said single bottom elements cut at said die from said strip of material wound in a reel and the subsequent insertion of the drawn bottom elements inside the mandrel of corresponding forming assemblies.

Preferably inside the mandrel of said forming assemblies there is a pusher member, operable axially to extract the cups manufactured by the same forming assemblies.

Preferably, said pusher member is provided frontally with a gripping surface connectable to suction means to retain said drawn bottom elements at the external opening of the mandrel of said forming assemblies.

The machine comprises second feeding means adapted to orderly collect single blanks from a store in which the same blanks are stacked and to transfer them in sequence, in an extended configuration, to the corresponding forming assemblies of said forming wheel.

Advantageously, said second feeding means comprises a wheel for gripping and transferring said blanks operable in rotation with continuous movement according to a rotation axis parallel to said rotation axis of the forming wheel and having a plurality of peripherally distributed arms which may swing around a respective axis parallel to the axis of rotation of the same gripping and transferring wheel, said arms carrying at the free end a respective gripping member adapted to collect a single blank from said magazine and to transfer it onto one said forming assembly of the forming wheel.

Preferably, this gripping device is angularly rotatable, on a respective axis of rotation, between a first position tangential to said gripping and transferring wheel of said blanks and a second position radial to the same wheel.

Preferably, heating means capable of heating at least one transverse edge of said blanks is associated with said gripping and transferring wheel of said blanks.

The machine includes folding means for wounding into tubular form said single blanks on said mandrel of the respective forming assemblies.

Preferably, said folding means comprises a pair of folding members consisting of shaped rollers rotatably carried on a fixed support externally to said forming wheel and operable in rotation in opposite directions, so as to progressively engage said blanks and to make them adhere to the external surface of said mandrel of the respective forming assemblies.

Preferably said folding members have a curved working surface so as to copy the outer surface of the mandrel of said forming assemblies.

The machine comprises welding means carried respectively by said swinging support member of said mandrel and movable in a radial direction to said mandrel for welding overlapping edges of a said single blank wound into a tubular form on the same mandrel.

Conveniently, said mandrel is angularly rotatable around its axis, on said swinging support member, between a position of receiving one said single blank and a position in which said overlapping edges of the same blank wound into tubular form on said mandrel are arranged in front of said welding means.

The machine comprises joining means adapted to join tight said individual blanks to said corresponding bottom elements.

Preferably, said joining means comprises thermal welding means.

Preferably, said thermal welding means comprises a hot air generator adapted to heat said bottom elements held at the external opening of the mandrel of said respective forming assemblies, said hot air generator being movable on command of an actuator member carried by said swinging support member of said mandrel, on a plane radial to said forming wheel from an inactive retracted position to an active position superimposed on the bottom element associated with said blank wound into tubular form on said mandrel.

The machine comprises curling means adapted to fold the lower edge and the upper edge of said side element of the cups.

The machine comprises a finishing wheel operable in rotation with continuous movement according to a rotation axis parallel to said rotation axis of the forming wheel and bearing a plurality of peripherally distributed containers adapted to receive respectively said cups from said forming wheel.

Advantageously, said containers are associated with a respective support member which may swing around an axis parallel to said axis of rotation of the finishing wheel.

A pusher member is suitably housed inside the tubular shaped mandrel of said forming assemblies, operable axially to extract the cup from the forming assembly and to transfer the same cup inside a respective container of said finishing wheel.

Preferably, said pusher member is provided frontally with a gripping surface connectable to suction means to retain said bottom element of the cup.

The present invention also relates to a method for manufacturing disposable cups comprising the steps of a. rotating with continuous movement a forming wheel bearing a plurality of peripherally distributed forming assemblies comprising respectively a tubular-shaped mandrel having a profile corresponding to the cup to be made, carried by a support member swinging around an axis parallel to the axis of rotation of the forming wheel;
b. taking single bottom elements in an orderly manner by first feeding means and inserting them into corresponding forming assemblies of said forming wheel;
c. taking single blanks in an orderly manner by means of second feeding means from a store in which the same blanks are stacked and transferring them in sequence, in an extended configuration, to corresponding forming assemblies of said forming wheel;
d. carrying out the tubular winding of said single blanks by folding means on said mandrel of the respective forming assemblies;
e. joining tight by thermal welding means said single blanks wound into a tubular form to said corresponding bottom elements.

BRIEF DESCRIPTION OF DRAWINGS

The details of the invention will become more apparent from the detailed description of a preferred embodiment of the machine for manufacturing paper cups, illustrated by way of example in the accompanying drawings, wherein.

DETAILED DESCRIPTION OF EMBODIMENTS OF THE INVENTION

Figure 1:
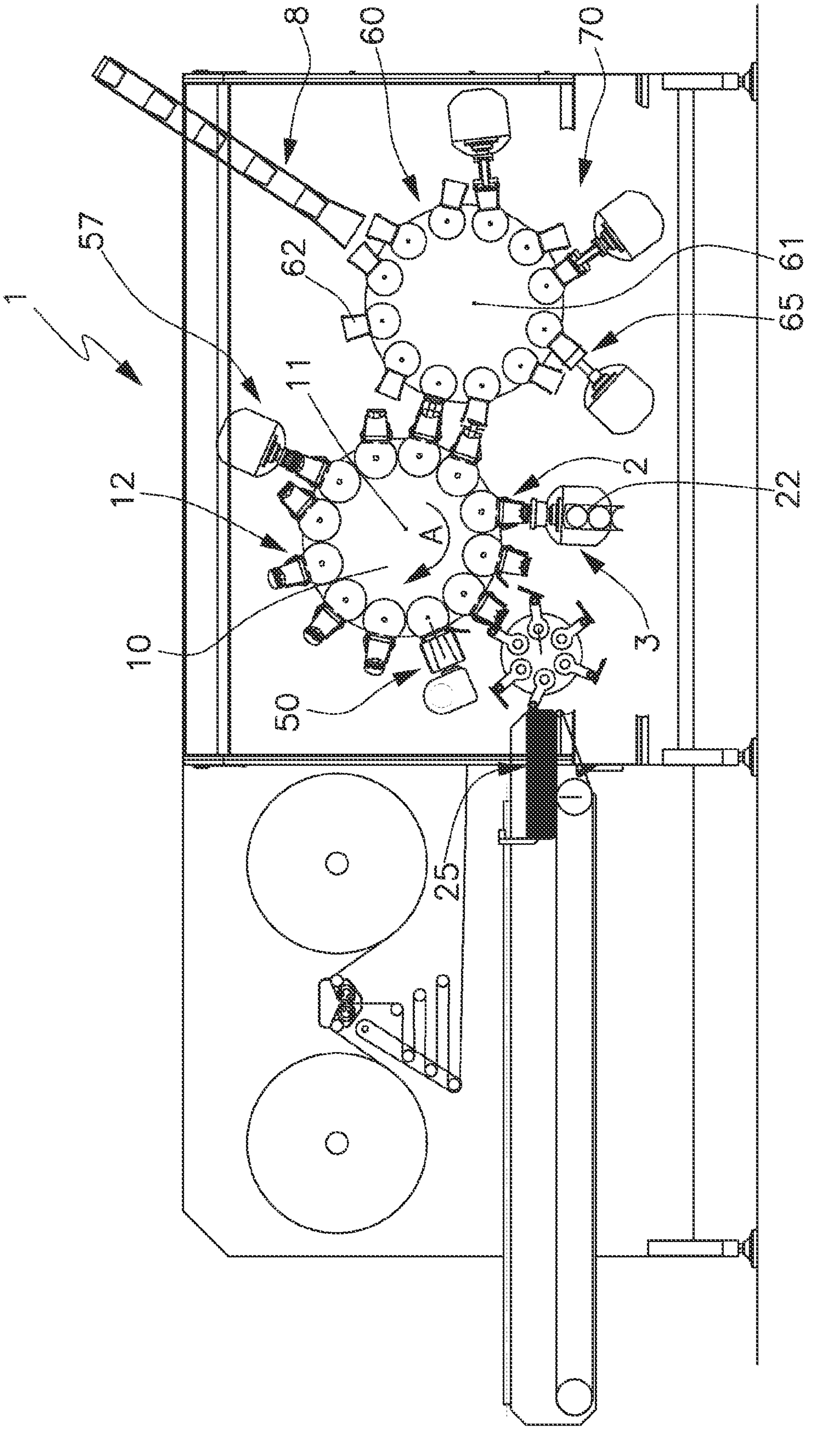
FIG. 1 shows a front view of the paper cup manufacturing machine according to the present invention.
Figure 2:
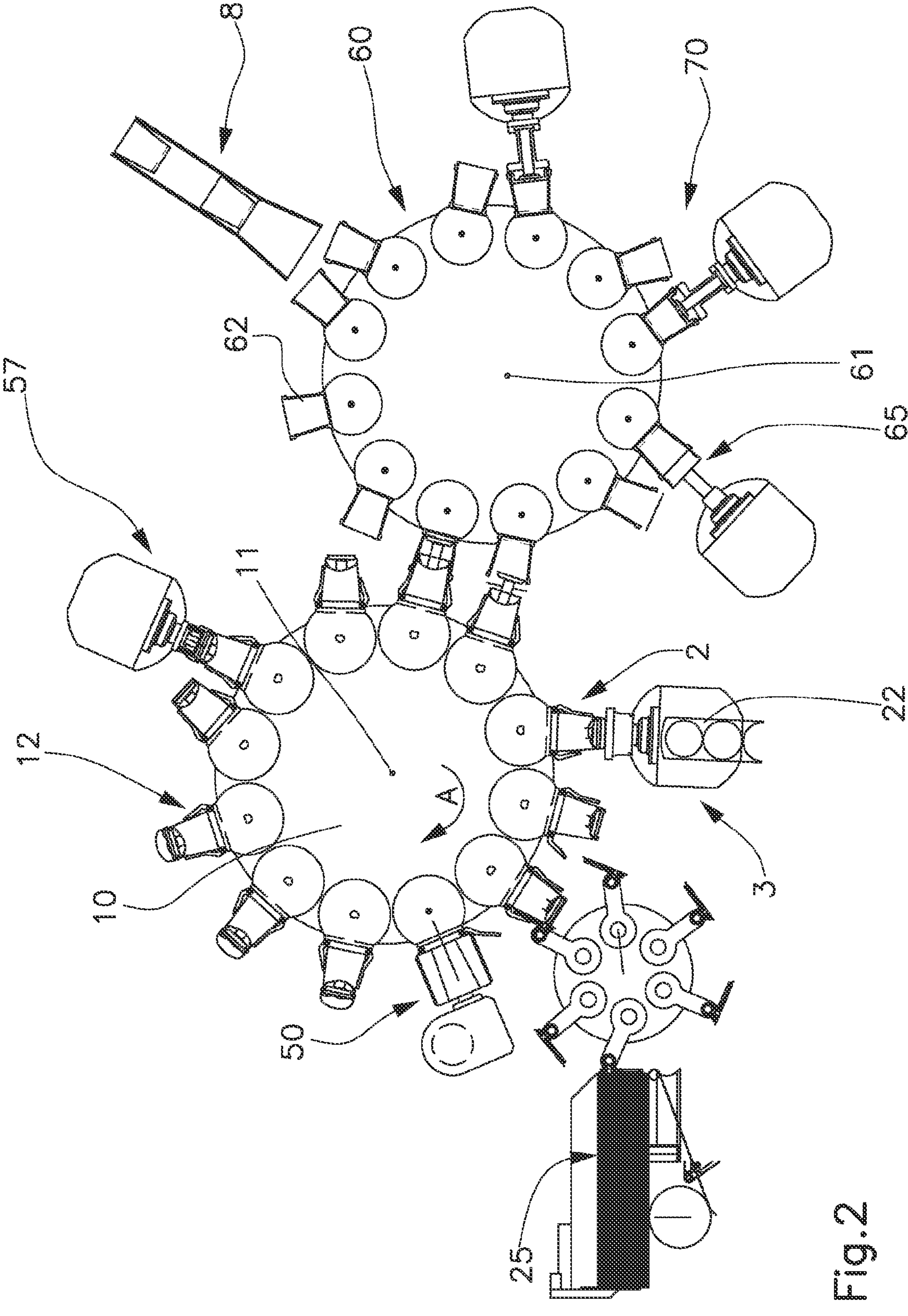
FIG. 2 shows an enlarged front view of an operative area of the machine for manufacturing paper cups.

With particular reference to these figures, the machine for manufacturing disposable cups 2, commonly known as paper cups, has been indicated in whole with the reference numeral 1. In the context of the present invention, the expression "paper cups" means any type of disposable cups made of a cardboard-type sheet material, cellulose pulp, so-called paper plastics and the like, of known use in the considered sector.

The paper cups 2 generally consist of a side element 20, obtained from a blank of said sheet material folded into a slightly conical shape, sealed by a circular bottom element 21.

The machine 1 comprises first feeding means 3, for feeding in sequence single bottoms 21 to a forming wheel 10 of the paper cups 2 and second feeding means 4 for feeding in sequence single blank elements 20 to the same forming wheel 10 of the paper cups 2. The forming wheel 10 is operable in rotation with continuous motion, according to a horizontal axis 11, to bring the individual blanks 20 and bottoms 21 at a plurality of operative stations where the manufacturing of the paper cups 2 is carried out. In particular, as specified below, the forming wheel 10 has a plurality of peripherally distributed forming assemblies 12 adapted to carry said blanks 20 and said bottoms 21 to said operative stations.

Figure 5:
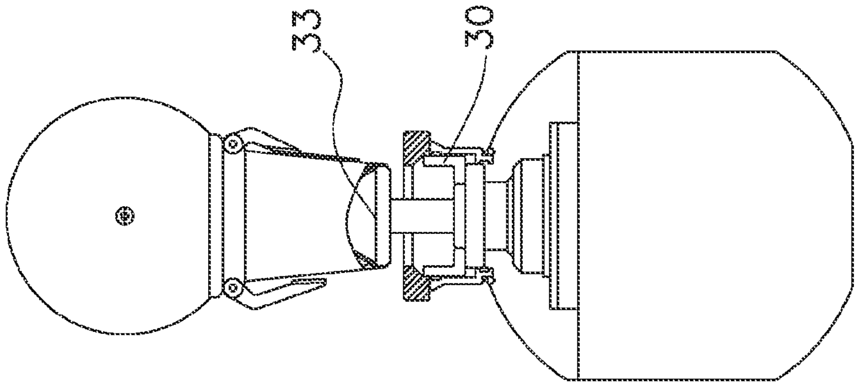
FIGS. 3-21 respectively show detailed views of individual parts of the machine.
Figure 4:
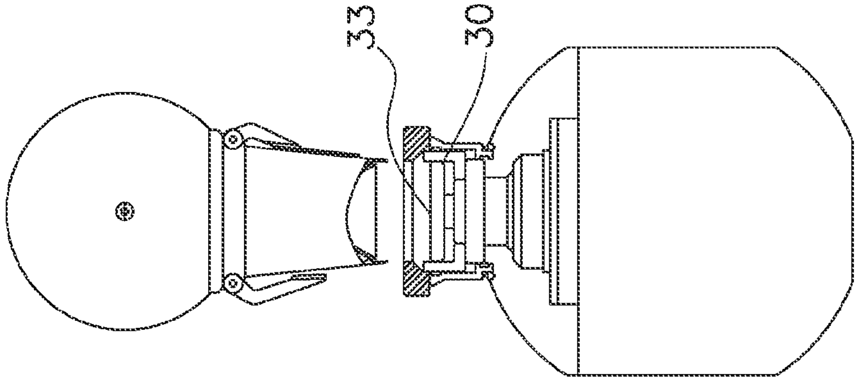
Figure 3:
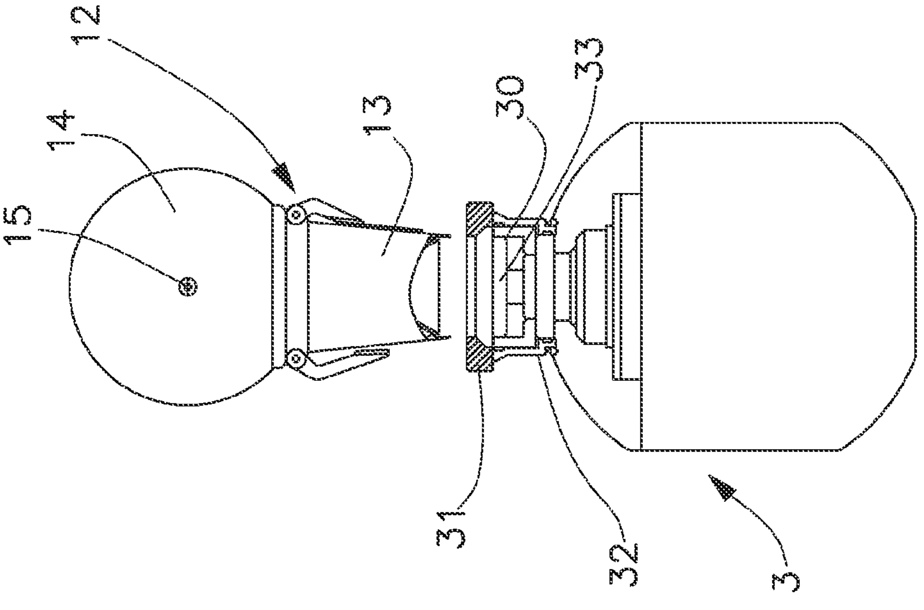

The first feeding means 3 of the single bottoms 21 comprises a shearing member 30 adapted to cut in sequence said individual bottoms 21 from a strip of material of a special reel 22 and to deliver them to a forming assembly 12 rotatable peripherally with respect to said forming wheel 10 (see FIGS. 3, 4 and 5). Each forming assembly 12 comprises a mandrel 13 of metal material having a slightly conical shape corresponding to the shape of the cup 2 to be formed. The mandrel 13 has an outwardly facing opening and a base associated with a support member 14, of substantially cylindrical shape. The outer opening has smaller diametric dimensions than the base associated with the support member 14. The support member 14 may swing around to an axis 15 parallel to the axis of rotation 11 of the same forming wheel 10.

The shearing member 30 is adapted to cooperate with a drawing die 31 during the step of feeding the single bottom 21 to the forming wheel 10. The die 31 consists essentially of a ring forming an inner portion having a converging profile. The reel 22 is adapted to be tightened between the external front surface of the die 31 and a special tightening member 32 in the shape of a cup. In particular, the shearing member 30 is movable alternately in an axial direction to the die 31 so as to shear a circular portion of the reel 22 intended to form a single bottom 21 of the cup 2. In a suitable phase relationship, a punch 33 is then actuated, coaxial to the shearing member 30, adapted to engage the sheared bottom 21. The movement of the piston 33 determines the drawing of the bottom 21 cut at the die 31 and the subsequent insertion of the bottom 21 embedded into the minor base of the mandrel 13. The drawing determines the formation of an edge 23 folded peripherally to the bottom 21.

A pusher member 16 is housed inside the mandrel 13, adapted to be driven axially to operate the subsequent extraction of the cup 2 from the forming assembly 12, as specified below. The pusher member 16 is provided at the front with a gripping surface connectable to the suction means to hold in abutment the bottom 21 of the cup.

The second feeding means 4 of the single blanks 20 comprises a wheel 40 adapted to orderly collect said blanks 20 from a store 25 in which they are stacked and to transfer them in sequence to corresponding forming assemblies 12 of the forming wheel 10.

Figure 6:
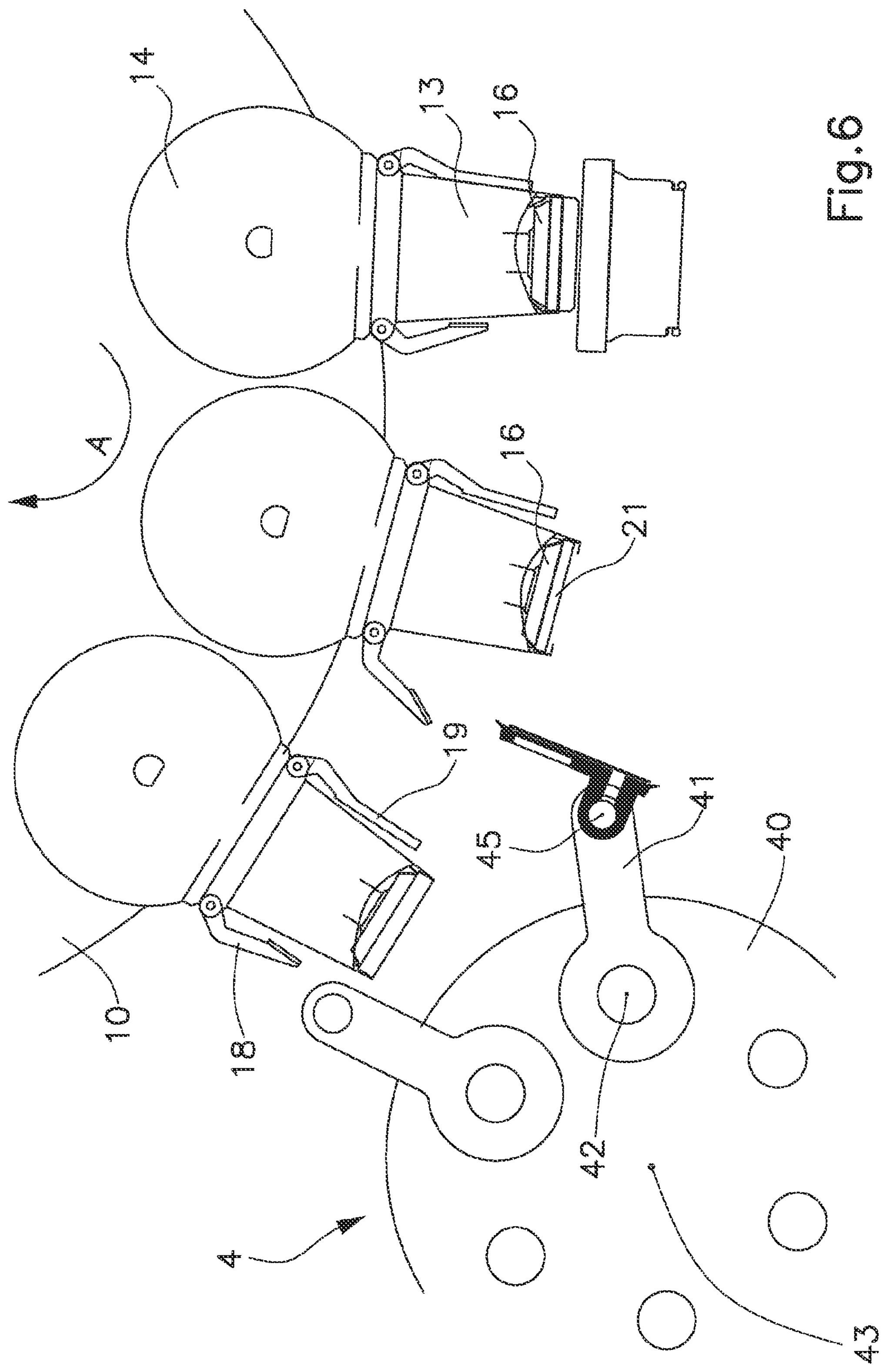
Figure 7:
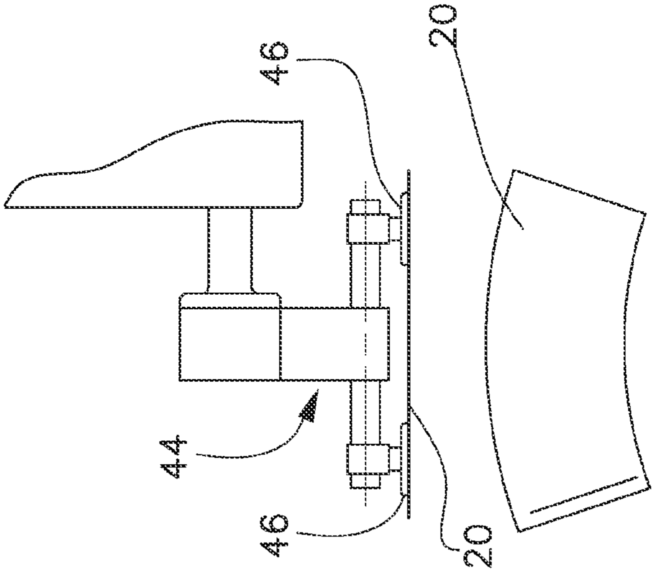

The wheel 40 for gripping and transferring the blanks 20 has a plurality of peripherally distributed arms 41 which may swing around a respective axis 42 parallel to the axis of rotation 43 of the same wheel 40 (see FIGS. 6 and 7). The arms 41 carry at the free end a gripping member 44 adapted to collect the blank 20 from the store 23 and to transfer it to a forming assembly 12 of the forming wheel 10.

To this end, the gripping member 44 is angularly rotatable, on a rotation axis 45, between a first position substantially tangential to the wheel 40 for gripping and transferring the blanks 20 and a second position substantially radial to the same wheel 40.

In particular, each gripping member 44 comprises a pair of suction cup members 46, suitably spaced apart, adapted to be sucked in to grip the blank 20 to be collected and transferred. During the rotation of the gripping wheel 40 for transferring the blanks 20 to the respective forming assemblies 12, special heating means, not shown, provides for heating at least one transverse edge of the blanks 20.

The blank 20 may be retained on the outer surface of the mandrel 13 of the forming assembly 12 by a first gripper 18 pivoted at the inner base of the same mandrel 13. In a position diametrically opposite to the first gripper 18, a second gripper 19 is pivoted to retain the blank 20 after winding on the mandrel 13 of the forming assembly 12, as specified below. The second gripper 19 is formed by a pair of jaws 19*a*, 19*b* that can be operated independently of each other. Downstream of the zone 20 of transferring the blanks on the forming assemblies 12, according to the direction A of rotation of the forming wheel 10, a folding means 50 is arranged to carry out the winding of the blanks 20 in a tubular manner on the mandrel 13 of the relative forming assembly 12 (see FIGS. 8-12).

The folding means 50 comprises a pair of folding members 51 consisting of shaped rollers carried rotatably on a support 52 fixed externally to the forming wheel 10. The folding members 51 are rotatable in opposite directions, according to respective axes parallel to the axis of rotation of the forming wheel 10, so as to progressively engage the blanks 20 and to make them adhere to the external surface of the mandrel 13 of the respective forming assemblies 12. To this end, the folding members 51 have a curved work surface in so as to substantially copy the outer surface of the mandrel 13 of the forming assemblies 12.

More precisely, as illustrated in FIGS. 8-12, the forming assembly 12 carrying the blank 20, retained on the mandrel 13 by the first gripper 18, advances between the counter-rotating folding members 51 which, in suitable phase relationship, wind the two opposite edges of the blank 20 on the mandrel 13. When said winding is almost finished, the jaws 19*a*, 19*b* of the second gripper 19 are operated in sequence. The first jaw 19*a* locks a first flap of the blank 20 on the mandrel 13; the second jaw 19*b* overlaps and tightens the second flap on the first flap, completing the winding.

It should be noted that, when the winding is finished, a flap of the blank 20 is suitably superimposed for a portion thereof on the opposite flap.

Suitably, the flap of the blank 20 superimposed on one of its sections on the opposite flap is previously heated from the inner side.

Figure 13:
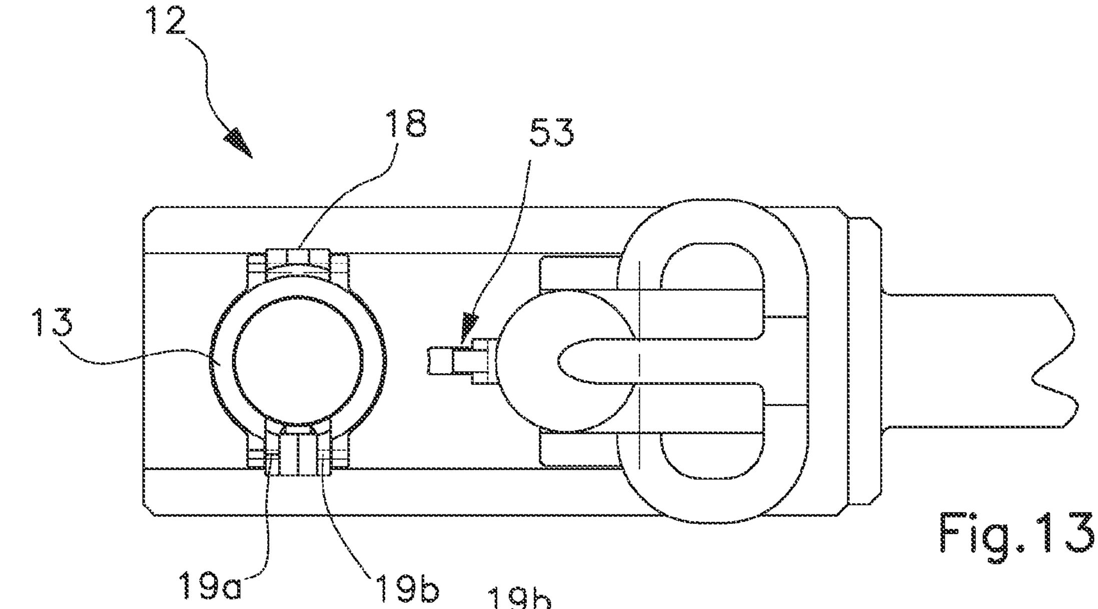
Figure 14:
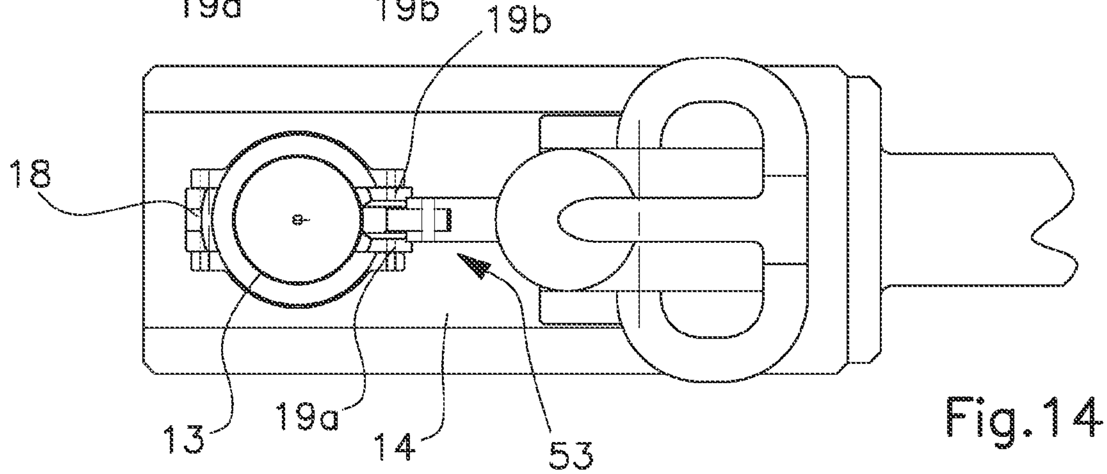

Welding means 53 of the overlapping flaps of the blank 20, also moved on the support member 14, may cooperate with the folding means 50. To this end, the mandrel 13 is carried angularly on the support member 14 around its longitudinal axis, so as to enable angular rotation for a width of substantially 90° to bring the edges of the superimposed transverse edges of the blank 20 in front of the welding means 53 (FIGS. 13 and 14). The welding means 53 is operable in the radial direction to the mandrel 13 so as to be inserted between the jaws 19*a*, 19*b* of the second gripper 19.

The welding means 53 can be of different types, depending on the sheet material constituting the blanks 20. For example, it is possible to use thermal welding means or alternatively ultrasonic or pulse welding means.

Figure 15:
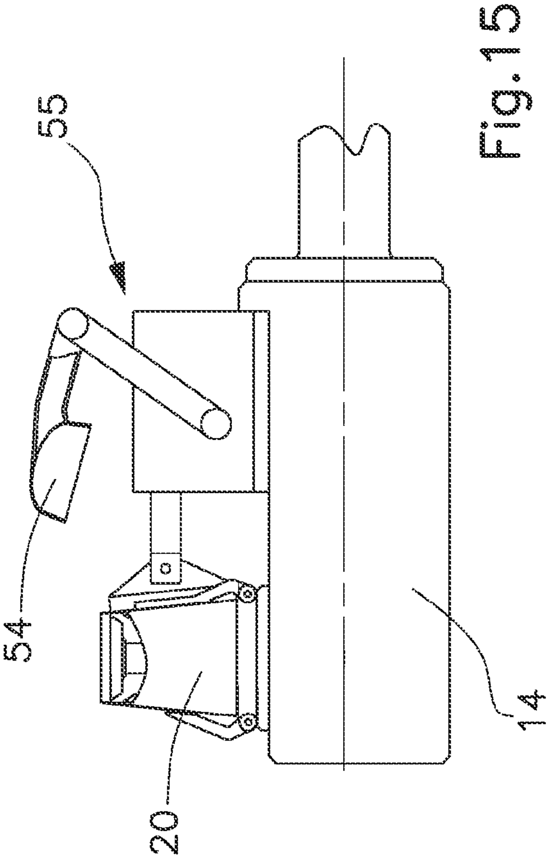
Figure 16:
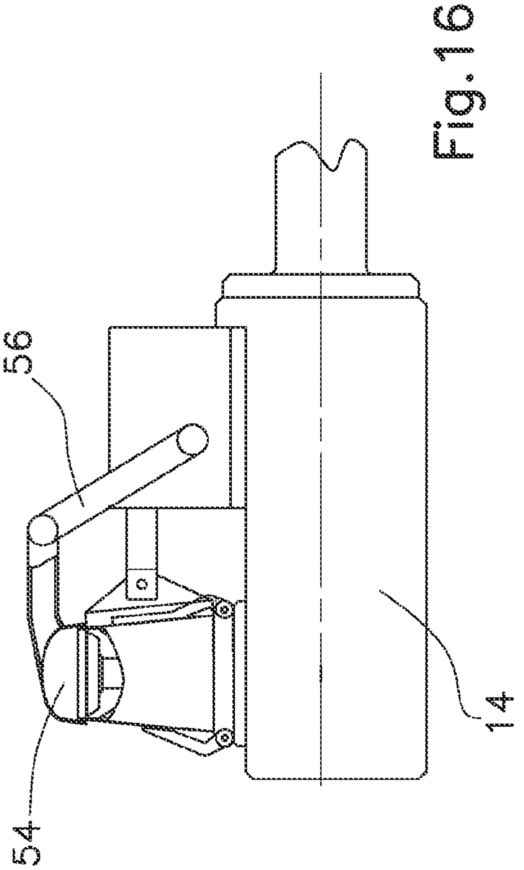

A hot air generator 54 adapted to heat the bottom 21 and the respective folded edge 23 to an appropriate temperature is also brought on the support member 14 (FIGS. 15 and 16).

The hot air generator 54 is movable on command of a special actuating member 55 carried by the swinging support member 14. The actuating member 55 is provided with an articulated arm 56 movable on a plane substantially radial to the forming wheel 10 to shift the hot air generator 54 from an inactive retracted position to an active position superimposed on the bottom 21 of the semi-finished article 20.

The heating produced by the hot air generator 54 is able to weld the peripheral edge 23 of the bottom 21 inside the semi-finished article 20.

Figure 17:
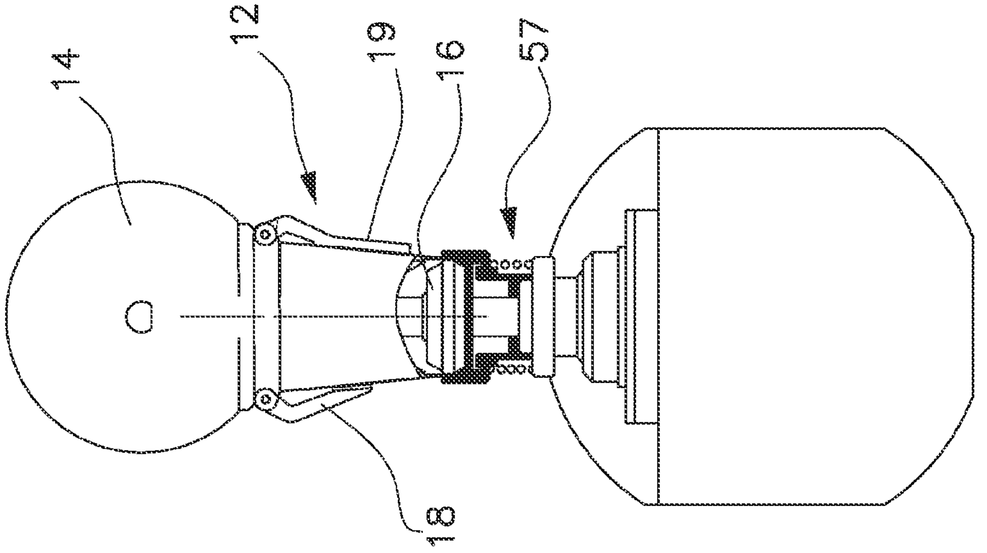

Then, the curling of the bottom of the cup takes place, in the sector also known as "bottom curling", by a heading assembly 57 acting in an axial direction on the mandrel 13 of the folding assembly 12 (FIG. 17). The heading assembly 57 comprises a first folding member 58 adapted to fold the free edge 24 of the semi-finished product 20 inwardly and a second folding member 59 adapted to head the same edge 24 of the semi-finished product 20 to the peripheral edge 23 of the bottom 21 that closes said semi-finished product 20.

Figure 18:
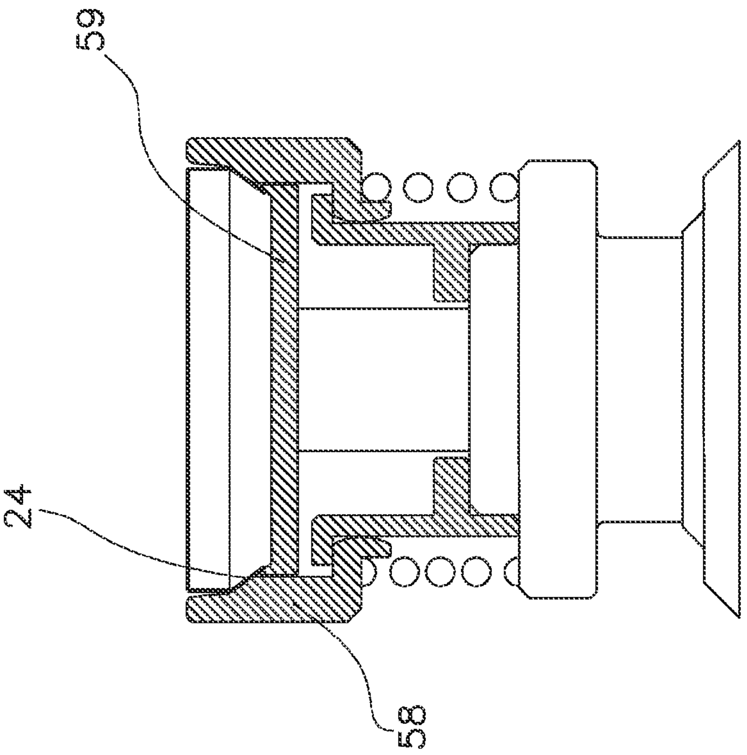

In particular, the first folding member 58 consists of a sprung ring internally having a flared profile able to engage the free edge 24 of the semi-finished article 20 to carry our a first folding towards the inside of the mandrel 13; the second folding member 59 consists of a piston which may be actuated axially to the aforementioned spring ring to head the edge 24 of the semi-finished product 2 onto the peripheral edge 23 of the bottom 21 (see the enlarged detail of FIG. 18).

Figure 19:
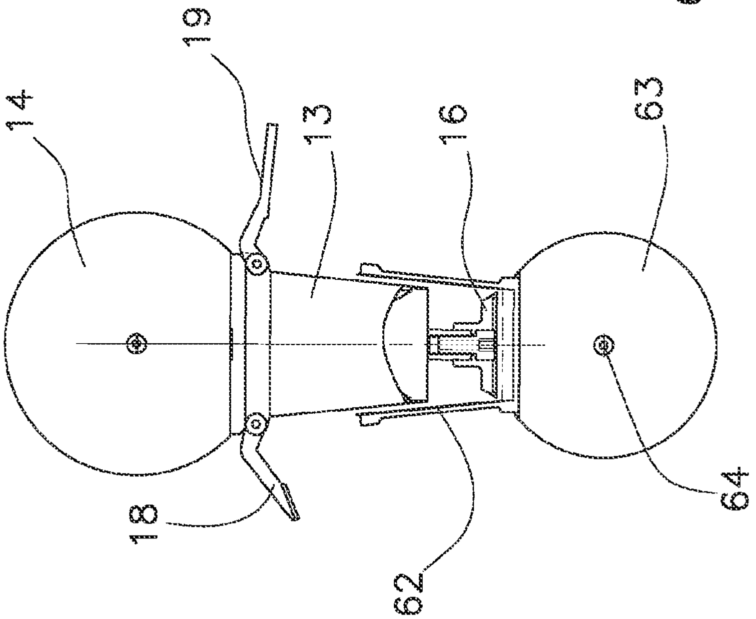

The cup 2 is then transferred to a finishing wheel 60, driven in rotation in the same way with continuous movement according to an axis of rotation 61 parallel to the axis of rotation 11 of the forming wheel 10. The finishing wheel 60 has a plurality of peripherally distributed containers 62, made of metal material, which may bring the cups 2 to a plurality of finishing operating stations. The containers 62 are associated with a respective support member 63, which may swing according to an axis 64 parallel to the axis of rotation 61 of the same finishing wheel 60 (FIG. 19).

The transfer of the cups 2 in sequence within the respective containers 62 is carried out by the axial operation of the pusher member 16, acting on the bottom 21 of the same cups. This axial operation of the pusher member 16 is performed in a suitable phase relationship with the opening of the grippers 18, 19 that hold the cup 2 on the external surface of the mandrel 13 of the forming assembly 12, so as to free the cup 2 itself and to enable translation thereof inside the container 62.

Figure 20:
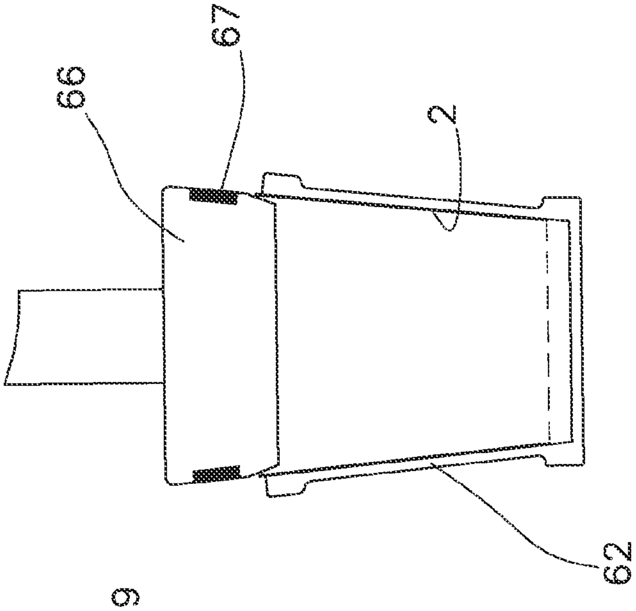

The cups 2 inserted inside the respective containers 62 are brought by the finishing wheel 60 to a station 65 for the application of a suitable lubricating substance capable of facilitating the subsequent curling phase of the same cups 2. This station 65 for application of the lubricating substance essentially provides a shaped punch 66 movable in the radial direction to the finishing wheel 60 and bearing a sponge ring 67 soaked in the aforementioned lubricating substance (FIG. 20).

Figure 21:
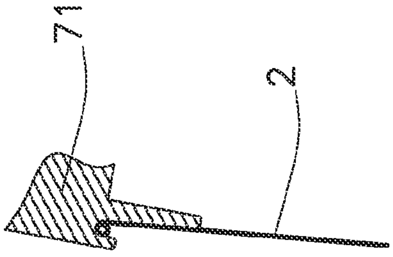

Downstream of the station 65 for applying lubricating substance is a top curling station 70 of the cups 2, in the sector also known as "top curling", preferably implemented in two successive phases, substantially similar from a constructive and functional point of view. Basically, in the upper curling station 70, first and second coupling means 71, which may grasp the upper edge of the cups 2 and curl them outwards, act in sequence (FIG. 21).

Finally, the finished cups 2 are ejected through a tubular member 8 for pneumatic transfer, operating in a known-per-se manner.

The operation of the machine for manufacturing paper cups is easily understandable from the above description.

In operation, the first feeding means 3 and the second feeding means 4 respectively feed in sequence the bottom elements 21 and the blanks 20 to the forming wheel 10, operated in rotation with continuous movement.

In particular, the first feeding means 3 collects and orderly inserts single bottom elements 21 at the opening of the tubular mandrel 13 of corresponding forming assemblies 12 of the forming wheel 10.

The shearing member 30 of the first feeding means 3 cuts in sequence the single bottoms 21 from a strip of material wound in a reel 22, clamped against the annular-shaped drawing die 31 (FIGS. 3 and 4). The operation of the punch 33, coaxial to the cutting member 30, draws the single bottoms 21 cut from the strip of material wound in a reel 22 at the die 31 and causes the subsequent insertion of the embedded bottoms 21 into the opening of the mandrel 13 of corresponding forming assembly 12 (FIG. 5).

In a suitable phase relationship, the second feeding means 4 orderly collects single blanks 20 from the store 25 in which the same blanks 20 are stacked and transfer them in sequence, in an extended configuration, to the corresponding forming assemblies 12 of the forming wheel 10.

The single blanks 20 are gripped by the gripping members 44 carried by the arms 41 of the gripping and transferring wheel 40, operated in rotation with continuous movement according to an axis of rotation 43 parallel to the axis of rotation 11 of the forming wheel 10. The arms 41 swing around a respective axis 42 parallel to the axis of rotation 43 of the wheel 40 for gripping and transferring the blanks 20.

It should be noted that the gripping members 44 are angularly rotatable, on the respective axis of rotation 45, between a first position substantially tangential to the wheel 40 for gripping and transferring the blanks 20 and a second position substantially radial to the same wheel 40, wherein the blanks 20 are associated, in an extended configuration, with the tubular mandrel 13 of the corresponding forming assemblies 12.

In particular, the blanks 20 are applied on the front side of the tubular mandrel 13, according to the direction A of rotation of the forming wheel 10.

According to the present invention, during the step of transferring the blanks 20 to the forming wheel 10, the forming assemblies 12 and the arms 41 of the gripping wheel 40 swing with respect to the same wheels 10, 40, upon command of cam means (not shown), so as to have zero relative velocity. In this way it is possible to transfer the blanks 20 without interrupting the continuous rotation movement of the forming wheel 10 and of the gripping and transferring wheel 40.

The blanks 20 transferred in an extended configuration on the tubular mandrel 13 of the respective forming assemblies 12 are held on the external surface of this mandrel 13 by the first gripper 18, pivoted at the base of the same mandrel 13.

In this configuration, the blanks 20 are brought to engage in succession the folding means 50 that performs the winding in tubular form on the mandrel 13 of the respective forming assemblies 12 (FIGS. 8-12).

Figure 12:
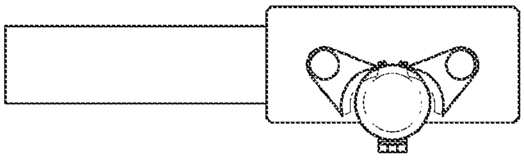
Figure 11:
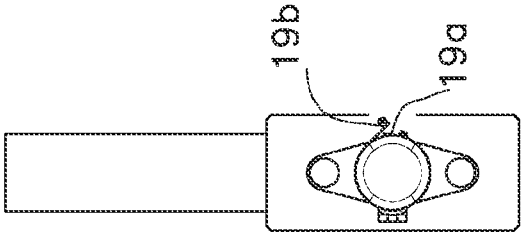
Figure 10:
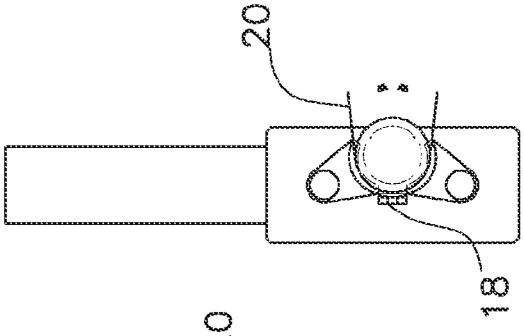
Figure 9:
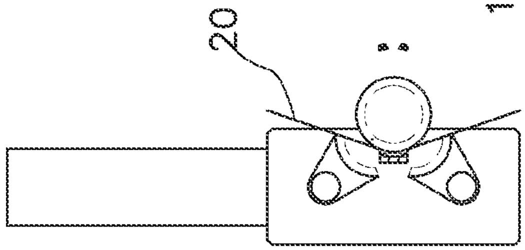
Figure 8:
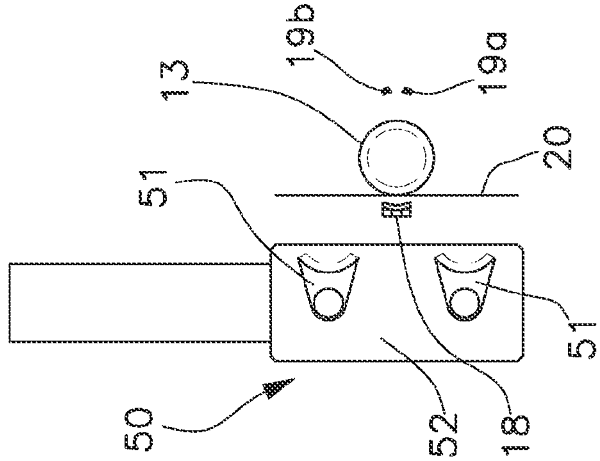

In particular, during the winding step, the blanks 20 advance between the counter-rotating folding members 51 which, in a suitable phase relationship, progressively engage the two opposite edges of the blank 20 (FIGS. 8, 9 and 10). When the winding is almost finished, the jaws 19*a*, 19*b* of the second gripper 19 are operated in sequence. The first jaw 19*a* locks a first edge of the blank 20 on the mandrel 13 (FIG. 11); the second jaw 19*b* overlaps and clamps the second flap on the first flap, completing the winding (FIG. 12).

The overlapping of the transversal edges of the blanks 20, pressed by the second gripper 19, permits to carry out the welding of the same edges, as at least one of them has been heated for this purpose from the internal side during the step of transferring from the gripping wheel 40 to the forming wheel 10.

To this end, the angular rotation, for an amplitude of 90°, of the mandrel 13 carrying the wound blank 20, is operated, so as to arrange the overlapping edges in front of the welding means 53 (FIGS. 13 and 14). The welding means 53 are then operated in a radial direction to the mandrel 13 so as to fit between the jaws 19*a*, 19*b* of the second gripper 19.

The welding means 53 is kept in contact under pressure with the superimposed edges of the blank 20 wound on the mandrel 13 for a time sufficient to complete the perfect welding thereof.

In a suitable phase relationship, the thermal welding of the bottom elements 21 to the single blanks 20 is carried out by the operation of the hot air generator 54, carried on the same support members 14 bearing the forming assemblies 12.

In particular, the hot air generator 54 is movable on command of a special actuator member 55 between an inactive retracted position and an active position superimposed on the bottom 21 of the blank 20 wrapped in tubular form on the mandrel 13 (FIGS. 15 and 16). The hot air generator 54 heats the bottom 21 to an appropriate temperature to perform the thermal sealing of the peripheral edge 23 of the bottom 21 inside the blank 20 wrapped on the mandrel 13 and previously welded.

In this way, a semifinished product consisting of a side element 20 is obtained, starting from the blank of sheet material folded into a slightly conical tubular shape, sealed by a bottom element 21 of circular shape. The semi-finished product is still held on the forming assembly 12 by the opposing grippers 18, 19.

This semi-finished product is then subjected to a cup bottom curling step, by means of a heading assembly 57 acting in the axial direction to the mandrel 13 of the folding assembly 12 (FIG. 15). In particular, the curling of the bottom of the cup is performed in two steps by the first folding member 58, which folds the free edge 24 of the semi-finished product inwards, and by the second folding member 59, which heads the same edge 24 of the semi-finished product on the peripheral edge of the bottom 21 (see the enlarged detail of FIG. 16).

During the step of curling the bottom of the cup, the forming assembly 12 and the heading assembly 57 are swinging, on command of cam means (not shown), so as to have zero relative velocity.

The semi-finished product is then transferred to the finishing wheel 60, operated in rotation in the same way with continuous movement according to a rotation axis parallel to the rotation axis of the forming wheel 10 and peripherally distributed with a plurality of containers 62, suitable for receiving single semi-finished products in an orderly manner.

In order to be transferred to the finishing wheel 60, the semi-finished products are released by the grippers 18, 19 and simultaneously held at the bottom, on the inside, by the gripping surface connected to the suction means of the pusher member 16.

The axial actuation of the pusher member 16 determines the translation of the semi-finished product inside the container 62 (FIG. 17).

It should be noted that the containers 62 are associated with a respective support member 63, swinging around an axis 64 parallel to the rotation axis 61 of the finishing wheel 60, so as to follow the synchronous swinging movement of the forming assembly 12.

The cups 2 inserted inside the respective containers 62 are brought by the finishing wheel 60 to the station 65 for the application of a suitable lubricating substance capable of facilitating the subsequent step of top curling of the same cups 2. In the station 65 for the application of the lubricating substance a shaped punch 66 operates, movable in the radial direction of the finishing wheel 60 and carrying a sponge ring 67 soaked in the aforementioned lubricating substance (FIG. 18).

Downstream of the station 65 of applying lubricating substance, the cups 2 are carried in sequence by the finishing wheel 60 to the top curling station 70. The top curling is performed in two successive steps, by activating the first and second coupling means 71 which are adapted to grip the top edge of the cups 2 and to curl them outwards (FIG. 19).

Finally, the packaged cups 2 are expelled through the tubular pneumatic transfer member 8.

The described machine achieves the object of manufacturing of paper cups with a high operating speed, so as to ensure a correspondingly high productivity. In particular, it has been verified that the manufacturing machine according to the invention permits to reach a productivity of about 700 cups per minute.

This is made possible thanks to the inventive idea of rotating the cup forming wheel with continuous movement at high speed, avoiding the stopping of the same forming wheel in the different operating stations which, in the known art, imposes inevitable limits on the machine speed. To this end, the cup-forming wheel rotates a plurality of forming assemblies comprising respectively a tubular-shaped mandrel having a profile corresponding to the cup to be made; said mandrel is associated with a support member which oscillates around an axis parallel to said axis of rotation of the forming wheel.

In practice, during the active phases, the forming crews are swinging in synchronism with the swinging movement of the operating members acting in the different stations of the machine, so as to have zero relative velocity, for a time sufficient to complete the operation.

Obviously, the high productivity so obtained allows the manufacturing of paper cups with a proportionately economic cost, in accordance with the characteristics required by a disposable product.

The machine for manufacturing paper cups described by way of example is susceptible of numerous modifications and variations according to the various requirements.

For example, it is possible to provide that, at the finishing wheel, a further cardboard side element is associated with the side surface of the paper cups, adapted to increase the insulation when used with beverages having a high temperature or a particularly low temperature.

In the practical embodiment of the invention, the materials used, as well as the shape and the dimensions, may be modified depending on needs.

Should the technical features mentioned in any claim be followed by reference signs, such reference signs were included strictly with the aim of enhancing the understanding of the claims and hence they shall not be deemed restrictive in any manner whatsoever on the scope of each element identified for exemplifying purposes by such reference signs.

The invention claimed is:

1. A machine for manufacturing disposable cups, said disposable cups comprising a side element, obtained starting from a blank of sheet material folded into a conical shape, sealed by a bottom element of circular shape, said machine comprising

- a forming wheel rotatable with continuous motion according to an axis of rotation and having, peripherally distributed thereon, a plurality of forming assemblies comprising respectively a mandrel of tubular shape having a profile corresponding to the cup to be made, said mandrel being held by a support member which may swing around an axis parallel to said axis of rotation of the forming wheel;
- first feeding means adapted to orderly collect and insert single bottom elements into corresponding forming assemblies of said forming wheel;
- second feeding means adapted to collect single blanks in an orderly manner from a store in which the blanks are stacked and to transfer them in sequence, in an extended configuration, to corresponding forming assemblies of said forming wheel;

folding means adapted to carry out tubular winding of said individual blanks on said mandrel of the respective forming assemblies;

welding means adapted to make, on said forming assemblies, individual items obtained by joining said blanks wound into tubular form with said corresponding bottom elements.

2. The machine of claim 1, wherein said forming assemblies respectively comprise gripper means arranged in diametrically opposite positions with respect to said mandrel and operable independently from each other to hold said individual blanks wound into tubular form on the same mandrel.

3. A machine of claim 1, further comprising a finishing wheel rotatable with continuous movement according to an axis of rotation parallel to said axis of rotation of the forming wheel and having a plurality of peripherally distributed containers associated with a respective support member, which may swing around an axis parallel to said axis of rotation of the finishing wheel, and adapted to receive respectively said cups from said forming wheel.

4. The machine of claim 1, wherein said first feeding means comprises a shearing member capable of cutting in sequence said single bottoms from a reel of strip material; an annular shaped drawing die shaping an internal portion with a converging profile; a punch, coaxial to said shearing member, able to perform the drawing of said individual bottoms sheared from said reel of strip material at said die and the subsequent insertion of the drawn bottoms inside the mandrel of corresponding forming assemblies.

5. The machine of claim 1, wherein said second feeding means comprises a wheel for gripping and transferring said blanks rotatable with continuous movement according to an axis of rotation parallel to said axis of rotation of the forming wheel and having, peripherally distributed thereon, a plurality of arms which may swing around a respective axis parallel to the axis of rotation of the same wheel, said arms having at the free end a respective gripping member capable of taking a single blank from said store and of transferring it to one said forming assembly of the forming wheel.

6. The machine of claim 5, wherein said gripping member is angularly rotatable, around a respective axis of rotation, between a first position tangential to said wheel for gripping and transferring said blanks and a second position radial to the same wheel.

7. The machine of claim 1, wherein said folding means comprises a pair of folding members consisting of shaped rollers rotatable on a support fixed externally to said forming wheel and rotatable in opposite directions, so as to progressively engage said blanks and bring them to adhere to the outer surface of said mandrel of the respective forming assemblies.

8. The machine of claim 1, further comprising curling means adapted to fold the lower edge and the upper edge of said side element of the cups.

9. The machine of claim 1, wherein said welding means is movable in a radial direction to said mandrel on said support member to carry out the welding of the opposite edges of said individual blanks wound into tubular form on the same mandrel.

10. A method for manufacturing disposable cups, comprising the steps of a. rotating with continuous movement a forming wheel bearing a plurality of peripherally distributed forming assemblies respectively comprising a mandrel of tubular form having a profile corresponding to the cup to be made, carried by a support member swinging around an axis parallel to the axis of rotation of the forming wheel;

b. orderly taking single bottom elements by means of first feeding means and inserting them into corresponding forming assemblies of said forming wheel;

c. orderly taking single blanks by means of second feeding means from a store in which the blanks are stacked and transferring them in sequence, in an extended configuration, to the corresponding forming assemblies of said forming wheel;

d. carrying out the tubular winding of said individual blanks by folding means on said mandrel of the respective forming assemblies;

e. carrying out by welding means the mutual junction of opposite edges of said individual blanks wound into tubular form on said mandrel of the respective forming assemblies and the union of said individual blanks wound into tubular form to said corresponding bottom elements.

* * * * *